May 20, 1930.   S. F. GOSS   1,759,826
PRIMER VALVE
Filed Dec. 18, 1926
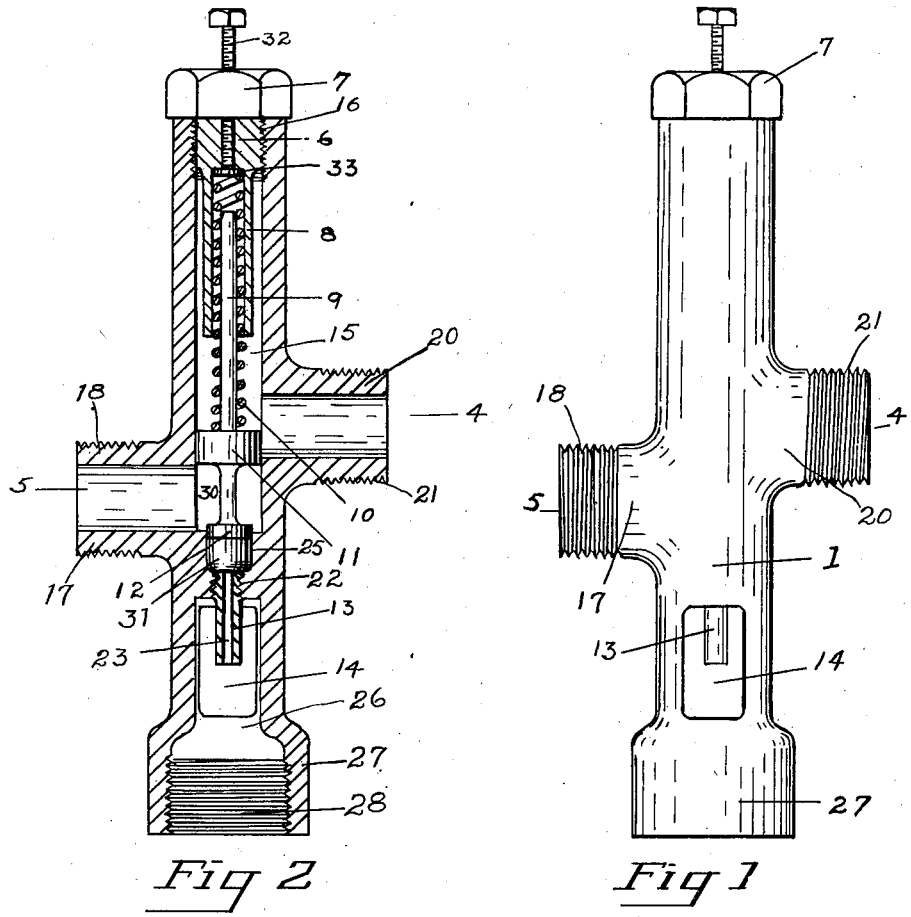
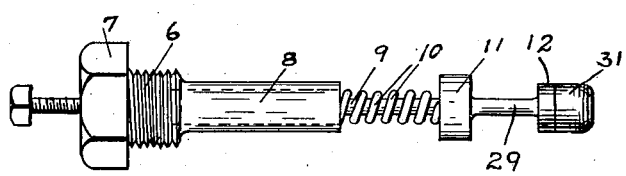
Inventor:
Samuel F. Goss,
By Horace Barnes,
Attorney.

Patented May 20, 1930

1,759,826

UNITED STATES PATENT OFFICE

SAMUEL F. GOSS, OF PORTLAND, OREGON

PRIMER VALVE

Application filed December 18, 1926. Serial No. 155,740.

This invention relates to improvements in primer valves for floor drain traps and the like.

The object of my invention is the provision of a primer valve of simple construction and automatic operation which may be readily connected in a service or supply line for water to a dwelling or building and by branch communications connected with a trap such as a floor drain trap which, through disuse, may become inoperative as a trap through the evaporation of the water therein, and whereby water is injected through said connections through the operation of the valve upon the opening of any outlet to said service pipes and the flow of water thereto through said valve.

A further object of my invention is the provision of simple and effective means in a valve of the type described for adjusting the tension against which the water pressure may operate the valve.

A still further object of the invention is the provision of means in a valve of the class described whereby the operation of the injecting devices to the floor drain trap may be observed and the danger of said trap being deprived of water is still further removed.

Other objects and advantages of my invention, and objects relating to details of construction and arrangement of parts thereof, will be readily apparent in the course of the detailed description to follow.

The accompanying drawings illustrate by way of example a preferred form of my improved primer valve, in which:

Figure 1 is a view in side elevation of an embodiment of a primer valve of my invention.

Fig. 2 is a view in vertical section thereof.

Fig. 3 is a view in side elevation of the valve member and certain connected parts shown detached.

Referring to said views, the reference numeral 1 indicates the body of my improved primer valve of generally cylindrical configuration having a tubular bore 15 extending from one end and at which end it is provided with internal screw threads 16. A screw threaded plug 6 engages with said screw threads closing said bore and is provided with an external head 7 upon which to apply a wrench. Said body is provided with a boss 17 formed with a passage 5 extending to and communicating with the lower end of the bore 15 and provided with external screw threads 18 to which connections may be made with a pipe leading from a source of water supply to the dwelling or building, or from a branch connection to any of the service outlets of the building.

Immediately above and preferably upon the opposite side of said body a similar boss 20 is formed having a passage 4 and external screw threads 21 with which connections may be made with the pipe leading to a service fixture of the building. The passages 4 and 5 are desirably disposed at different elevations so that water will not pass directly therethrough. At the bottom of said bore an axially disposed bore 22 is formed which is screw threaded to receive a nipple 13 having a small axially arranged passage 23 communicating with the bore 15. Between the upper end of the passage 23 and passage 5 a valve seat 25 is provided.

The valve body extends downwardly about the nipple 13 affording a chamber 26 which is formed with a hub 27 having internal screw threads 28 with which connection may be made with a pipe, not shown, leading to a floor drain trap, not shown. The body walls may be cut away, as at 14, upon opposite sides of the chamber 26 to expose the lower end of the nipple 13 whereby water issuing from said nipple may be exposed to view.

A movable valve member is provided for said bore having a cylindrical plunger disk 11 slidable in the bore 15 and making watertight connection with the walls thereof and in one position preventing the flow of water from the inlet passage 5 to the outlet 4. A slightly smaller disk 12 is connected to the disk 11 by a centrally disposed stem 29 providing an annular space 30 between the disks of approximately the diameter of the passage 5. A cushion valve member 31 is fixedly secured to the underside of the disk 12 engaging the seat 25 normally closing the passage 23.

A valve stem 9 integral with the plunger disks extends upwardly in the bore 15 and has its upper end in an integral sleeve 8 of the plug 6 and about the stem a compression coil spring 10 is disposed, bearing at one end at the upper portion of said sleeve and at its opposite end upon the plunger disk 11, to yieldingly maintain the valve member at its lowermost position cutting off the flow of water. Secured to the lower side of the plunger disk 12 is a cushion member 31, engaging the seat 25 normally closing the passage 23.

Said plug 6 and head 7 are bored axially and screw threaded to receive an adjustment screw 32 having a disk plate 33 at its lower end within the sleeve 8 and bearing upon the upper end of the spring 9, whereby the compression of said spring may be varied, in a well-understood manner.

The operation of my invention may be briefly described as follows: My improved primer valve is designed to be introduced in a water supply pipe to a service fixture of a dwelling or building through making connections thereof to the bosses 17 and 20 as previously described, and the hub 27 is communicatively connected with a floor drain trap so that water passing therethrough will enter the trap to replenish the same.

With the valve in operative condition as described and illustrated in Fig. 2, and with the service outlets connected with the passage 4 closed, the pressure through the passage 5 will be equalized in the space 30 and upon the disks 11 and 12, so that the thrust of the compression spring 10 will maintain the valve in closed condition to prevent leakage of water through the passage 4 or passage 23. Upon the opening of an outlet in the building connected with the passage 4 and the consequent reduction of pressure therein, the pressure upon said valve disks will become unbalanced, and the valve member will rise in the bore against the tension of the spring 10 to allow a flow of water from the passage 5 to the passage 4 through the space 30, and the amount of said opening will vary to the extent to which the free passage of water is permitted from said outlet.

Through this lifting action of the valve the cushion 31 will also be lifted from its seat to open the passage 23 and cause a jet of water to issue through said passage into the chamber 26 and into the floor drain trap. Immediately the outlet is closed the water pressure in the pipe connections with the passage 4 will mount up and equalize until the force of the spring 10 will assert itself to depress the valve member and close the passageways 4 and 23 as before.

It is required in building codes of most modern cities to provide a method of replenishing the water of a floor drain trap from a service fixture, which supply heretofore has been usually taken from a water closet bowl, necessitating at times the running of pipe connections through floors of buildings and a considerable amount of plumber's work. Particularly at the present time when one-piece porcelain water closet bowls are coming into frequent use, it is particularly advantageous to provide convenient means for otherwise supplying such traps with safety and satisfaction and in conformity with modern requirements.

By the provision of the apertures 14, whereby the efficient operation of the supply devices may be observed, the safety factors of the trap may be safely preserved at all times, and any accidental stoppage of the device may be quickly remedied.

From the foregoing description, taken in connection wth the accompanying drawings, the advantages of the construction and application of my improved primer valves will be readily apparent; but, while I have described the principle of operation of the invention, together with the devices which I now consider the best embodiment thereof, it will be understood that the structures shown are merely illustrative and that such changes may be made therein as will lie within the scope of the following claims.

Having described my invention, what I claim, is:

1. In combination with a pipe leading from a source of water supply under pressure, a water pipe leading to a water-discharge fixture, and a pipe leading to a floor drain trap, a valve-body having a longitudinally disposed bore, laterally disposed passages in said body connecting said bore with said supply and discharge pipes, respectively, said passages being disposed in relatively offset relation, a branch-passage at the end of said bore upon the side of said supply-passage opposite to said discharge-passage and emptying into said trap-pipe, a valve-member formed with plunger disks positioned upon each side of said supply passage when the valve is closed and having an annular space between said disks registering with said supply passage, a spring yieldingly maintaining said valve member in closed position, and means for adjusting the force of said spring.

2. In combination with a pipe leading from a source of water supply under pressure, a water pipe leading to a water discharge fixture, and a pipe leading to a floor drain trap, a valve body having a longitudinally disposed bore, laterally disposed passages in said body connecting said bore with said supply and discharge pipes, respectively, said passages being disposed in relatively offset relation, a branch passage at the end of said bore upon the side of said supply passage opposite to said discharge passage and emptying into said trap pipe, a valve member formed with plunger disks positioned upon each side of said supply passage when the valve is closed and having an annular space between said disks registering with said supply passage, a cushion valve upon one end of said valve member adapted to rest upon said valve seat to close said branch passage, and a spring yieldingly maintaining said valve member in closed position.

3. In combination with a pipe leading from a source of water supply under pressure, a water pipe leading to a water discharge fixture, and a pipe leading to a floor drain trap, a valve body having a longitudinally disposed bore, laterally disposed passages in said body connecting said bore with said supply and discharge pipes, respectively, said passages being disposed in relatively offset relation, a branch passage at the end of said bore upon the side of said supply passage opposite to said discharge passage and emptying into said trap pipe, said trap pipe having a sight-opening to the lower end of said branch passage, a valve member formed with plunger disks positioned upon each side of said supply passage when the valve is closed and having an annular space between said disks registering with said supply passage, and a spring yieldingly maintaining said valve member in closed position.

4. In combination with a pipe leading from a source of water supply under pressure, a water pipe leading to a water discharge fixture, and a pipe leading to a floor drain trap, a valve body having a longitudinally disposed bore, laterally disposed passages in said body connecting said bore with said supply and discharge pipes, respectively, said passages being disposed in relatively offset relation, a branch passage at the end of said bore upon the side of said supply passage opposite to said discharge passage and emptying into said trap pipe, said trap pipe having a sight-opening to the lower end of said branch passage, a valve member formed with plunger disks positioned upon each side of said supply passage when the valve is closed and having an annular space between said disks registering with said supply passage, a cushion valve upon one end of said valve member adapted to rest upon said valve seat to close said branch passage, and a spring yieldingly maintaining said valve member in closed position.

5. In combination with a pipe leading from a source of water supply under pressure, a water pipe leading to a water discharge fixture, and a pipe leading to a floor drain trap, a valve body having a central bore and passages leading therefrom connecting with said pipes, respectively, and a valve-member spring-pressed to close all of said passages and responsive to a reduction of pressure upon one side thereof by the opening of said water discharge fixture to admit the passage of water through said discharge pipe and to said trap pipe.

6. In combination with a pipe leading from a source of water supply under pressure, a water pipe leading to a water discharge fixture, and a pipe leading to a floor drain trap, a valve body having a central bore and passages leading therefrom connecting with said pipes, respectively, and a valve-member spring pressed to close all of said passages and responsive to a reduction of pressure upon one side thereof by the opening of said water discharge fixture to admit the passage of water through said discharge pipe and to said trap pipe, said trap pipe having a sight-opening to the lower end of the passage connecting therewith.

SAMUEL F. GOSS.